United States Patent [19]

Steeves et al.

[11] 4,383,857
[45] May 17, 1983

[54] ATTACK POLISH FOR NICKEL-BASE ALLOYS AND STAINLESS STEELS

[75] Inventors: Arthur F. Steeves; Donald P. Buono, both of Schenectady, N.Y.

[73] Assignee: The United States of America as represented by the United States Department of Energy, Washington, D.C.

[21] Appl. No.: 280,572

[22] Filed: Jul. 6, 1981

Related U.S. Application Data

[62] Division of Ser. No. 154,171, May 28, 1980, Pat. No. 4,305,779.

[51] Int. Cl.$^3$ ............................................. C09G 1/00
[52] U.S. Cl. ........................................ 106/3; 134/3; 156/664; 252/79.4
[58] Field of Search ................ 106/3; 134/3; 156/636, 156/651, 664; 252/79.4

[56] References Cited

U.S. PATENT DOCUMENTS

| | | | |
|---|---|---|---|
| 2,940,838 | 6/1960 | Snyder et al. | 41/42 |
| 3,565,708 | 2/1971 | Ellis | 156/18 |
| 4,305,779 | 12/1981 | Steeves et al. | 156/636 |

*Primary Examiner*—John Kight, III
*Assistant Examiner*—Amelia B. Yarbrough
*Attorney, Agent, or Firm*—Michael F. Esposito; Richard G. Besha

[57] ABSTRACT

A chemical attack polish and polishing procedure for use on metal surfaces such as nickel base alloys and stainless steels. The chemical attack polish comprises $Fe(NO_3)_3$, concentrated $CH_3COOH$, concentrated $H_2SO_4$ and $H_2O$. The polishing procedure includes saturating a polishing cloth with the chemical attack polish and submicron abrasive particles and buffing the metal surface.

5 Claims, No Drawings

ATTACK POLISH FOR NICKEL-BASE ALLOYS AND STAINLESS STEELS

This is a division of application Ser. No. 154,171, filed May 28, 1980, now U.S. Pat. No. 4,305,779.

BACKGROUND OF THE INVENTION

The present invention relates to a new and improved chemical attack polish and process for polishing metal surfaces. The chemical attack polish includes $Fe(NO_3)_3$, concentrated $CH_3COOH$, concentrated $H_2SO_4$ and water. The metal polishing procedure comprises saturating a polishing cloth with the chemical attack polish of the present invention, adding submicron particles of abrasive materials (e.g. alumina) to the cloth, and polishing the metal surface. The United States Government has rights in this invention pursuant to Contract No EY-76-C-12-0052 between U.S. Department of Energy and General Electric.

Various mechanical polishing techniques have been proposed in an attempt to achieve flat surfaces for nickel-base alloys and stainless steels, substantially free of microscratches and flowed metal. For example, mechanical polishing of nickel-base alloys or stainless steels has been performed with standard diamond and aluminum oxide abrasives using a vibratory polisher. This technique required abnormally polishing times of approximately two hours. The problems with these procedures are: (1) they are long and laborious; (2) they leave some microscopic scratches on the metal surfaces which often interfere with microscopic evaluation, and (3) they leave a layer of flowed metal of indetermined thickness which must be removed by etching to reach an undisturbed or true surface condition.

Recently, efforts have been directed to developing a chemical attack composition and polish procedure which avoids the disadvantages observed with the above described mechanical techniques. A successful chemical attack polish for Zirconium-base alloys has been developed at Knolls Atomic Power Laboratory. However, this attack polish applied to nickel-base alloys and stainless steels has not been effective. Accordingly, the problem of developing a suitable chemical attack polish and polishing procedure for nickel-base alloys and stainless steels has not been solved.

SUMMARY OF THE INVENTION

It is the primary object of the present invention to provide a new and improved chemical attack polish composition for metal surfaces.

It is a further object of the present invention to provide a new and improved chemical attack polish composition for nickel-base alloys and stainless steels.

It is another object of the present invention to provide a new and improved chemical polishing process for the production of flat metal surfaces substantially free of microscratches and flowed metal.

It is still another object of the present invention to provide a new and improved chemical polishing process for the production of flat nickel-base alloy and stainless steel surfaces substantially free of microscratches and flowed metal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. To achieve the foregoing and other objects and in accordance with the purpose of the present invention, as embodied and broadly described herein, the chemical attack polish composition according to the present invention may comprise $Fe(NO_3)_3$, concentrated $CH_3COOH$, concentrated $H_2SO_4$ and $H_2O$. The ingredients are present in solution in an amount sufficient to provide an attack upon a metal surface to obtain a flat surface substantially free of microscratches and flowed metal.

In a preferred embodiment of the present invention, the chemical attack polish composition may comprise about 3 to 7 gms $Fe(NO_3)_3$, about 15 to 40 cc of concentrated $CH_3COOH$, about 3 to 7 cc of concentrated $H_2SO_4$ and $H_2O$ in an amount sufficient to provide about a 400 cc solution.

In a further preferred embodiment of the present invention, the chemical attack polish composition may comprise about 5 gms $Fe(NO_3)_3$, about 25 cc concentrated $CH_3COOH$, about 5 cc concentrated $H_2SO_4$ and $H_2O$ in an amount sufficient to provide about a 400 cc solution.

It is, of course, understood that the 400 cc solution is merely illustrative of the quantity of the resultant solution. Various multiples or fractions of this amount may be utilized provided that the proportions of the compounds are maintained. For example, if one disired to provide an 800 cc solution of the chemical attack polish of the present invention, one would double the amounts of each compound present.

In a further aspect of the present invention, a method is provided for polishing metal surfaces comprising (a) saturating a cloth with the chemical attack polish composition of the present invention; (b) adding submicron particles of abrasive material to the saturated cloth, and (c) polishing (i.e., buffing) the metal surface with the saturated cloth to produce a flat metal surface which is substantially free of flowed metal and microscratches.

In a preferred embodiment of the present invention, the metal surface comprises nickel-base alloys and stainless steels.

In a further preferred embodiment of the present invention, the polishing includes attaching the cloth to a polishing wheel and buffing for less than about 1 minute.

In a still further preferred embodiment of the present invention, the polishing includes buffing the metal surface by hand for less than about 3 minutes.

The chemical attack polish composition and procedure of the present invention eliminates the disadvantages set forth for the mechanical polishing techniques previously discussed. That is, the composition and procedure of the present invention results in the production of a flat metal surface substantially free of microscratches and flowed metal in a minimal time.

Reference will now be made in detail to the present preferred embodiment of the invention.

DETAILED DESCRIPTION OF THE INVENTION

The chemical attack polish composition of the present invention comprises $Fe(NO_3)_3$, concentrated $CH_3COOH$, concentrated $H_2SO_4$ and $H_2O$. This composition is prepared by placing these compounds into a suitable vessel. The compounds are mixed thoroughly to produce a homogeneous solution. The resultant solution, without further treatment, can be used for polishing metal surfaces, such as nickel-base alloys and stainless steels.

Preferably, the chemical attack polish composition comprises about 3 to 7 gms $Fe(NO_3)_3$, about 15 to 40 cc concentrated $CH_3COOH$, about 3 to 7 cc concentrated $H_2SO_4$ and $H_2O$ in an amount sufficient to provide about a 400 cc solution. In a further preferred embodiment, the chemical attack polish composition comprises about 5 gms $Fe(NO_3)_3$, about 25 cc concentrated $CH_3COOH$, about 5 cc concentrated $H_2SO_4$ and $H_2O$ in an amount sufficient to provide about a 400 cc solution. The compounds are mixed throughly as previously disclosed. It is, of course, understood that various multiples or fractions of the 400 cc solution may be utilized provided that the proportions of the components are maintained.

The polishing procedure of the present invention utilizes the above described chemical attack polish. A polishing cloth is saturated with the chemical attack polish of the present invention. Submicron particles of abrasive material are added to the saturated cloth. The metal surface is then polished with the saturated cloth for a time sufficient to obtain a flat metal surface which is substantially free of microscratches and flowed metal. The polishing may be accomplished by hand or a polishing wheel. When the polishing is done by hand, the metal surface is usually buffed for less than about 3 minutes. If polishing is performed with a polishing wheel, buffing for less than one minute is sufficient.

The submicron particles are selected from conventional abrasive materials (e.g. diamonds, $Al_2O_3$). Preferably, the abrasive material is $Al_2O_3$ and the particle size is about 0.05 microns.

An illustrative example of the present invention follows:

EXAMPLE

The following ingredients are mixed in a beaker: 5 gms $Fe(NO_3)_3$, 25 cc concentrated $CH_3COOH$ and 5 cc concentrated $H_2SO_4$. Water is added to this mixture in an amount sufficient to provide a 400 cc solution. The solution is mixed thoroughly.

A polishing cloth is saturated with the above described solution. $Al_2O_3$ abrasive particles (0.05 microns) are added to the saturated polishing cloth.

This saturated polishing cloth is used to polish three metal surfaces, identified as nickel-base alloys "Alloy 600" and "Alloy 625," and stainless steel "Type 347."

A comparison of the dark field micrographs taken of the metal surfaces treated by the composition and process of the present invention with the dark field micrographs of the same metal surfaces treated by the previously discussed mechanical polishing techniques indicates that the present invention provides a surface finish having substantially less microscratches and no flowed metal. In addition, the polishing procedure of the present invention requires substantially less time.

While not being limited to a particular theory, it is postulated that the chemical attack polish and procedure of the present invention are particularly effective because of the unique relationship of the polishing abrasive and the chemical attack solution. It is believed that the chemical attack polish of the present invention attacks the metal surface to an insignificant extent, forming a passivating oxide film, which is then removed by the submicron abrasive only to be reformed instantaneously, etc. This continuous cycle (i.e. forming, removing, reforming) produces an extremely flat surface substantially free of microscratches and flowed metal.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A chemical attack polish for use in polishing metal surfaces consisting essentially of:
   about 3 to 7 gms $Fe(NO_3)_3$,
   about 15 to 40 cc $CH_3COOH$ (concentrated),
   about 3 to 7 cc $H_2SO_4$ (concentrated),
   and $H_2O$ in an amount sufficient to make about a 400 cc solution.

2. The chemical polishing composition of claim 1 wherein the amount of $Fe(NO_3)_3$ is about 5 gms.

3. The chemical attack polish of claim 1 wherein the amount of $CH_3COOH$ is about 25 cc.

4. The chemical attack polish of claim 1 wherein the amount of $H_2SO_4$ is about 5 cc.

5. The chemical attack polish of claim 1 consisting essentially of:
   about 5 gm $Fe(NO_3)_3$,
   about 25 cc $CH_3COOH$ (concentrated),
   about 5 cc $H_2SO_4$ (concentrated), and
   $H_2O$ in an amount sufficient to make about a 400 cc solution.

* * * * *